(12) United States Patent
Kempas

(10) Patent No.: US 7,938,542 B2
(45) Date of Patent: May 10, 2011

(54) OPTICAL SWIVELING DEVICE FOR IMAGING AND/OR PROJECTION OF AN OBJECT SCENE

(75) Inventor: Hagen Kempas, Überlingen (DE)

(73) Assignee: Diehl BGT Defence GmbH & Co. KG, Ueberlingen (DE)

( * ) Notice: Subject to any disclaimer, the term of this patent is extended or adjusted under 35 U.S.C. 154(b) by 351 days.

(21) Appl. No.: 12/173,041

(22) Filed: Jul. 15, 2008

(65) Prior Publication Data

US 2009/0027750 A1 Jan. 29, 2009

(30) Foreign Application Priority Data

Jul. 28, 2007 (DE) .......... 10 2007 035 552

(51) Int. Cl.
*G02B 26/08* (2006.01)
(52) U.S. Cl. ......... 353/50; 348/146
(58) Field of Classification Search ........... 353/50; 348/146
See application file for complete search history.

(56) References Cited

U.S. PATENT DOCUMENTS

| | | | |
|---|---|---|---|
| 5,262,630 A | 11/1993 | Kordulla | |
| 5,669,580 A * | 9/1997 | Strauss | 244/3.16 |
| 6,036,140 A | 3/2000 | Tränapp et al. | |
| 7,236,299 B1 | 6/2007 | Smith | |
| 7,564,478 B2 * | 7/2009 | Baumann et al. | 348/146 |

FOREIGN PATENT DOCUMENTS

| | | |
|---|---|---|
| DE | 10135222 A1 | 2/2003 |
| GB | 2322437 A | 8/1998 |

* cited by examiner

Primary Examiner — Seung C Sohn
(74) Attorney, Agent, or Firm — Laurence A. Greenberg; Werner H. Stemer; Ralph E. Locher

(57) ABSTRACT

An optical swiveling device is specified for imaging and/or projection of an object scene, having a supporting structure, having a detection/transmission unit arranged in the supporting structure, having a pitch frame and having a roll frame, with the pitch frame being mounted in the roll frame such that it can rotate about a pitch axis and with the roll frame being mounted in the supporting structure such that it can rotate about a roll axis. In this case the pitch axis and the roll axis intersect at an intersection angle of less than 90°. First deflection optics are arranged in the pitch frame such that a beam propagating along the pitch axis is deflected in an object-side direction which intersects the pitch axis at the intersection angle, and vice versa, and second deflection optics are arranged in the roll frame such that a beam propagating along the pitch axis is deflected in the direction along the roll axis, and vice versa.

14 Claims, 3 Drawing Sheets

OPTICAL SWIVELING DEVICE FOR IMAGING AND/OR PROJECTION OF AN OBJECT SCENE

CROSS-REFERENCE TO RELATED APPLICATION

This application claims the priority, under 35 U.S.C. §119, of German application DE 10 2007 035 552.3, filed Jul. 28, 2007; the prior application is herewith incorporated by reference in its entirety.

BACKGROUND OF THE INVENTION

Field of the Invention

The invention relates to an optical swiveling device for imaging and/or projection of an object scene. The object of the swiveling device is to allow the optical path of a recording or projection appliance to be positioned within a large solid angle range such that a comparatively small part of the solid angle range can be recorded and a projection is possible within this small part.

A swiveling device such as this can be used for many different purposes. It can therefore be used to produce architectural records, for example of the interiors of churches or the like, to cartographically record large areas such as cave systems, in particular by means of laser range finding, or for projecting recordings or films into specific solid angle ranges. A swiveling device such as this can likewise be used as a monitoring or search device both in the visible and in the invisible spectral ranges and conversely is, however, also suitable for use as a 3D target simulator with a high-resolution target projection display. In particular, a swiveling device such as this can also be used for target detection in a homing head of a guided missile. In particular, the swiveling device can be used to monitor large areas or spaces in the civilian field, as an anti-terrorism measure.

In order to record a small section within a large field of view or solid angle range, German published patent application DE 101 35 222 A1 discloses an optical swiveling device which comprises a pitch frame, which can rotate about a pitch axis, in a roll frame which can rotate about a roll axis. The pitch axis and the roll axis intersect each other at an angle of 90°. First deflection optics are arranged in the pitch frame, through which the imaging beam path can be deflected in the direction along the pitch axis. Second deflection optics are provided in the roll frame, by means of which the deflected beam path of the first deflection optics is recorded along the pitch axis and is deflected in the direction of the roll axis. A detector for detection of the recorded field of view section is arranged on the roll axis.

A swiveling device according to the prior art such as this makes it possible to record a large field of view, that is to say a large solid angle range, using one detector which is fixed to the structure.

SUMMARY OF THE INVENTION

The object of the invention is to specify an optical swiveling device for imaging and/or projection of an object scene within a large solid angle range, which comprises a detection/transmission unit fixed to the structure and which is further improved over known swiveling devices according to the prior art.

With the foregoing and other objects in view there is provided, in accordance with the invention, a optical swiveling device for imaging and/or projecting an object scene, comprising:

a supporting structure;
a detection/transmission unit disposed in the supporting structure;
a roll frame rotatably mounted in said supporting structure about a roll axis, and a pitch frame rotatably mounted in said roll frame about a pitch axis;
said pitch axis and said roll axis intersecting one another at an intersection angle of less than 90°;
first deflection optics disposed in said pitch frame and configured to deflect a beam propagating along said pitch axis in an object-side direction intersecting said pitch axis at the intersection angle, and vice versa; and
second deflection optics disposed in said roll frame and configured to deflect a beam propagating along said pitch axis in a direction along the roll axis, and vice versa.

In other words, the objects of the invention are achieved by an optical swiveling device having a supporting structure, having a detection/transmission unit arranged in the supporting structure, having a pitch frame and having a roll frame, with the pitch frame being mounted in the roll frame such that it can rotate about a pitch axis and with the roll frame being mounted in the supporting structure such that it can rotate about a roll axis, with the pitch axis and the roll axis intersecting at an intersection angle of less than 90°, having first deflection optics arranged in the pitch frame such that a beam propagating along the pitch axis is deflected in an object-side direction which intersects the pitch axis at the intersection angle, and vice versa, and having second deflection optics arranged in the roll frame such that a beam propagating along the pitch axis is deflected in the direction along the roll axis, and vice versa.

A first step of the invention is in this case based on the idea that, in the case of the swiveling device according to the prior art that has been mentioned, the pitch frame cannot revolve completely with respect to the roll frame, thus leading to a certain inaccessibility in reaching desired positions. In some circumstances, in order to reach an adjacent position, the pitch frame must first of all be moved back in the opposite direction, and the roll frame must carry out a more or less complete revolution. This inaccessibility in the movement is due to the fact that the pitch axis and the roll axis intersect at an angle of 90°. Because of this, the pitch frame cannot carry out a complete revolution with respect to the roll frame.

In a second step, the invention is based on the idea that the pitch frame and roll frame can move independently of one another if the intersection angle between the pitch axis and the roll axis is less than 90°. In this case, assuming a perfect arrangement of the respective components, this in particular allows the pitch frame to revolve completely with respect to the roll frame.

If the intersection angle between the roll axis and the pitch axis is less than 90°, then the process of reaching specific positions is considerably simplified in comparison to the swiveling devices according to the prior art. Overall, this allows a large solid angle range to be covered more quickly, as well.

The fact that rotation of the pitch frame about a pitch axis which is at an angle of less than 90° to the roll axis leads not only to a change in the elevation angle but also to a change in the azimuth angle can be compensated for without any problems by appropriate control.

In one variant, which is advantageous because it can be implemented technically easily, the optical swiveling device is designed such that the pitch axis and the roll axis intersect at an angle of 45°. This refinement makes it possible to image or project an object scene within a complete hemisphere so that an adequately large solid angle range can be covered both for civilian surveillance purposes and for identification of targets in homing heads. Any angular position can be selected with an optical axis within the hemisphere by movement of the pitch frame and of the roll frame about the pitch and roll axes, respectively.

In principle, the beam path can be deflected in the first and/or second deflection optics by refraction, diffraction or reflection. When using reflection surfaces for deflection of the beams, however, optical components with a small physical size can be used, thus making it possible, overall, to achieve a swiveling device of compact design.

In a further preferred refinement, the first and the second deflection optics each comprise a prism. A prism is distinguished by boundary surfaces of different inclination and, as a single optical component, offers the capability to deliberately deflect beams by means of refraction and reflection. In addition, the surfaces of the prism through which beams pass can additionally be designed to influence the imaging, in particular to widen it and to focus the beam cross section. These characteristics predestine the use of prisms in deflection optics, in order to allow a compact design to be achieved.

In order to reduce or largely avoid image rotation between the object scene and the detection/transmission unit, the prisms are expediently designed and arranged such that they each have an even number of reflection surfaces. The smallest possible design by means of prisms is achieved when they are designed and arranged such that they have only two reflection surfaces for guidance of the beam passing through them.

In a further advantageous refinement, the two prisms each have a first and a second side surface, as well as a base surface, with the first side surface being inclined at the intersection angle, in particular at 45°, to the base surface, and with the second side surface being inclined at half the intersection angle, in particular at 22.5°, to the base surface, with the prisms being aligned with a first side surface and with a base plane-parallel to one another. Overall, this arrangement results in distortion-free imaging and projection using just two prisms, with the base surface in each case representing both a reflection surface and a surface for beams to pass through. A beam which enters the respective prism at right angles through the base surface is totally internally reflected on the second side surface, because of its inclination, and is once again thrown back towards the base surface, on which it is likewise totally internally reflected because of the change in the incidence angle, and is thrown at right angles against the first side surface, where it emerges without reflection losses. This also applies in the same sense to the opposite beam path. The first side surface and a base surface form the coupling between the two prisms, with one of the prisms being associated with the pitch frame, and the other prism being associated with the roll frame. Rotation of the prisms with respect to one another by rotation of the pitch frame about the pitch axis does not lead to any change in the optical imaging.

The first and/or the second deflection optics are advantageously designed to produce a real intermediate image, in particular within the prisms. The two-stage formation of the beam path overall, with a real intermediate image being produced between the object scene and the detection/transmission unit, minimizes the beam cross section in the area of the intermediate image. If the intermediate image is located within the prisms, then their size can be further reduced, because the beam cross section has been reduced.

Since the pitch axis is inclined at an angle of less than 90° to the roll axis, it is also possible to drive the pitch frame fixed to the structure. For this purpose, a connecting element is expediently arranged on the pitch frame, in which a coupling element which is fixed to the structure and can rotate engages for drive purposes. In particular, the coupling element which can rotate may be in the form of a rotating ring, in particular a toothed ring, arranged coaxially with respect to the roll axis. This refinement means that it is no longer necessary to couple supply lines for driving the pitch frame to the roll frame by means of slip rings or the like, for example, such that they can rotate. This avoids complex and expensive additional complexity.

In the case of the swiveling device that has been mentioned, the optical axis runs through the intersection point of the pitch axis with the roll axis. For this reason, it is possible to integrate the swiveling device under a transparent dome which is fixed to the structure and whose centre is likewise located at the said intersection point. This allows hermetic sealing against poor environmental conditions.

As already mentioned, the swiveling device is in principle suitable for a very wide range of applications both in the civilian field and in the defense field. In particular, the swiveling device can be integrated in a homing head of a guided missile, or can be used for target detection.

Other features which are considered as characteristic for the invention are set forth in the appended claims.

Although the invention is illustrated and described herein as embodied in optical swiveling device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
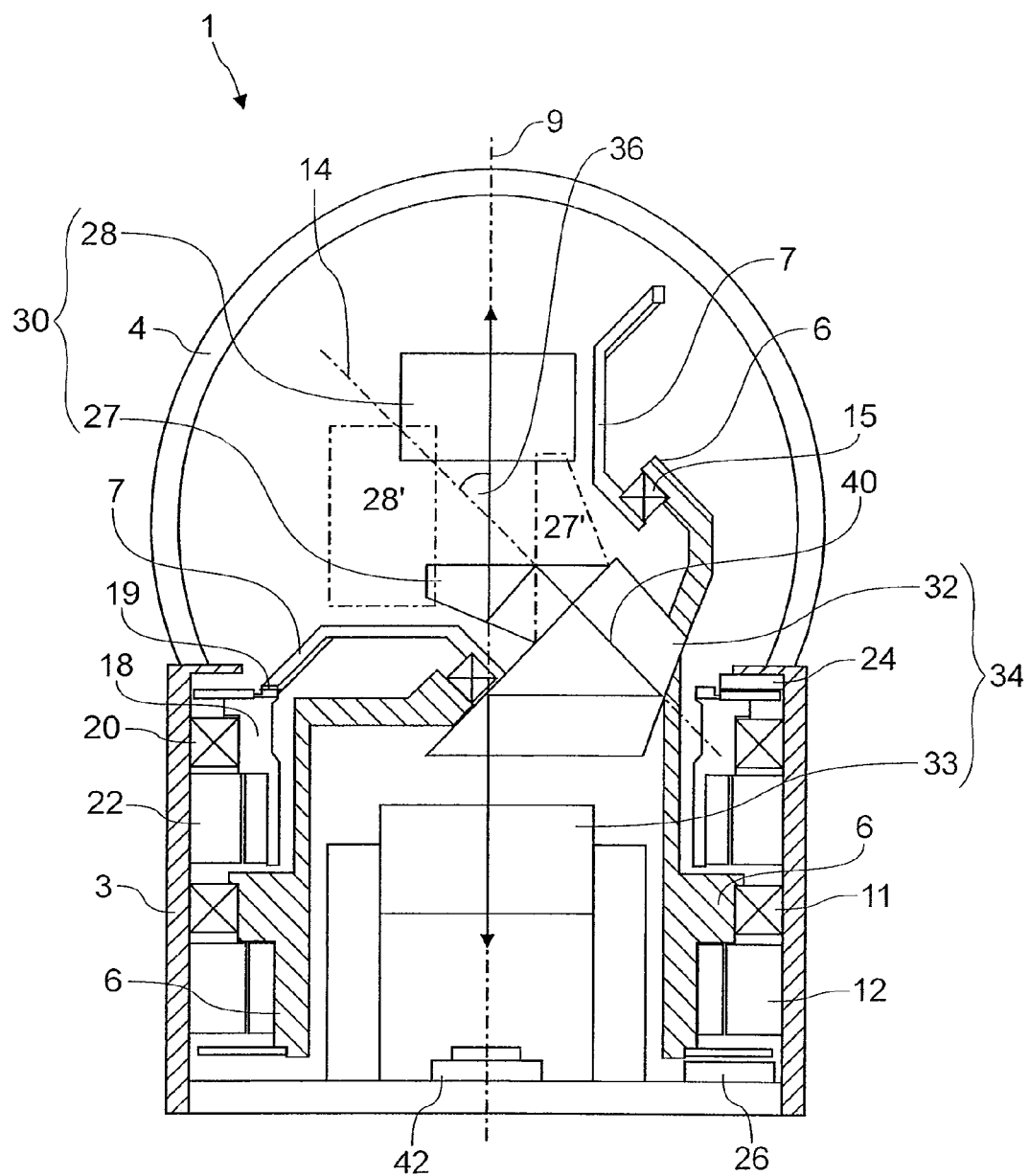
FIG. 1 is a section taken through an optical swiveling device having a pitch frame and a roll frame, with the pitch axis and the roll axis intersecting at an intersection angle of 45°.

Referring now to the figures of the drawing in detail and first, particularly, to FIG. 1 thereof, there is shown a cross section through the apparatus according to the invention, namely through an optical swiveling device 1 for the optical path of a recording and projection appliance. The optical swiveling device 1 in this case comprises a supporting structure 3 on which a transparent dome 4 rests, fixed to the structure. A roll frame 6 is mounted in the interior of the supporting structure 3 such that it can rotate and is fitted with a pitch frame 7 which is mounted such that it can rotate with respect to the roll frame 6.

The roll frame 6 is mounted by way of a first bearing 11, such as a ball bearing, for rotation about a roll axis 9 with respect to the supporting structure 3. The roll frame 6 is driven by a roll drive 12. The pitch frame 7 is in turn mounted by way of a second bearing 15, in particular a ball bearing, for rotation about the pitch axis 14, with respect to the roll frame 6. As can clearly be seen, the roll frame 6 together with the pitch frame 7 which is rotatably mounted in it such that it can rotate can rotate overall without any restriction within the dome 4. Both the pitch frame 7 and the roll frame 6 can carry out complete revolutions.

In order to drive the pitch frame 7, a coupling element 8 in the form of a rotating ring is provided, coaxially with respect to the roll axis 9, in the supporting structure 3. In order to drive the pitch frame 7, the coupling element 18 engages in a connecting element 19 which is mounted there and is likewise in the form of a revolving rotating ring. The coupling element 18 is mounted with respect to the supporting structure 3 by means of a third bearing 20, in particular a ball bearing. The coupling element 18 is driven by a pitch drive 22, which is fixed to the structure.

In order to move to a fixed position of the swiveling device 1, that is to say a predetermined alignment of the pitch frame 7 and of the roll frame 6, the rotation angle of the pitch frame 7 is recorded with respect to a norm position by means of an angle transmitter 24, which detects the position of the coupling element 18. The angular position of the roll frame 6 is determined by means of an angle transmitter 26. In order to take account of the inclination between the pitch axis 14 and the roll axis 9, an elevation angle and azimuth angle which are predetermined for imaging and/or projection are moved to or selected from the angular positions, as determined by means of the respective angle transmitters 24 and 26, of the pitch drive and of the roll drive.

In order to image or to project an object scene in a selected solid angle range, a first prism 27 and imaging optics 28 are firmly connected to the pitch frame 7. The first prism 27 and the imaging optics 28 together form deflection optics 30 in order to influence the beam path of both incoming and outgoing beams. A second prism 32 and focusing optics 33 are also firmly connected to the roll frame 6. The second prism 32 and the focusing optics 33 together form the second deflection optics 34. The imaging optics 28 and the focusing optics 33 are used to align the beam path between the object side and the detection and transmission side.

As can be seen, the first deflection optics 30 and the second deflection optics 34 are coupled to one another via a prismatic joint, with the prismatic joint being formed by the first prism 27 and the second prism 32. The first prism 27 can in this case rotate about the pitch axis 10 with respect to the second prism 32. For illustration with respect to the initial positions of the first prism 27 and of the imaging optics 28, which are represented by solid lines, their respective positions are also shown, represented by dashed lines, when the pitch frame 7 is rotated through a further 180°. The corresponding positions of the further-rotated first prism and of the further-rotated imaging optics are annotated 27' and 28', respectively.

In the case of the illustrated swiveling device 1, the roll axis 9 and the pitch axis 14 intersect at an angle 36 of 45°. In a corresponding manner, the two prisms 27 and 32 that are used are designed such that a beam which is initially propagating in the interior of the second prism 32 in the direction of the pitch axis 14 is deflected overall by the first prism 27 in an object-side direction which once again intersects the pitch axis 14 at the intersection angle 36. In the illustrated situation, the beam emerging from the second prism 32 is totally internally reflected on a boundary surface after entering the first prism 27, is thrown back against the opposite boundary surface, where it is likewise totally internally reflected, and finally emerges in the direction of the roll axis 9. In the opposite direction, a beam which emerges from the first prism 27 and is propagating along the pitch axis in the second prism 32 is totally internally reflected on a boundary surface of the second prism 32, is thrown against the opposite boundary surface, where it is totally internally reflected again, and is finally deflected overall in the direction of the roll axis 9. The beam path 40 relating to this is illustrated.

When the first prism 27 is in the position 27' indicated by dashed lines, then a beam which is entering the first prism 27 along the pitch axis 14 from the second prism 32 emerges, after being totally internally reflected twice on its boundary surfaces—once again intersecting the pitch axis 14 at an angle of 45°—, with the emerging beam path passing through the intersection point between the pitch axis 14 and the roll axis 9. In other words, in this situation, the emerging beam intersects the roll axis 9 at an angle of 90°.

As can be seen, the illustrated optical swiveling device 1 allows imaging and/or projection of an object scene from and/or in any given angle range within a hemisphere whose centre point is defined by the intersection point between the roll axis 9 and the pitch axis 14. A detection/transmission unit 42 is arranged on the supporting structure 3, for imaging and/or for projection along the roll axis 9.

By way of example, the detection/transmission unit 42 may be a CCD chip or a photomultiplier, which may be suitable for one or more wavelengths. For a projection application, the detection/transmission unit 42 may, for example, be in the form of a laser source. There is no need either for imaging or for projection to position the detection/transmission unit 42 on moving shafts. The detection/transmission unit 42 is firmly connected to the supporting structure 3.

Figure 2:
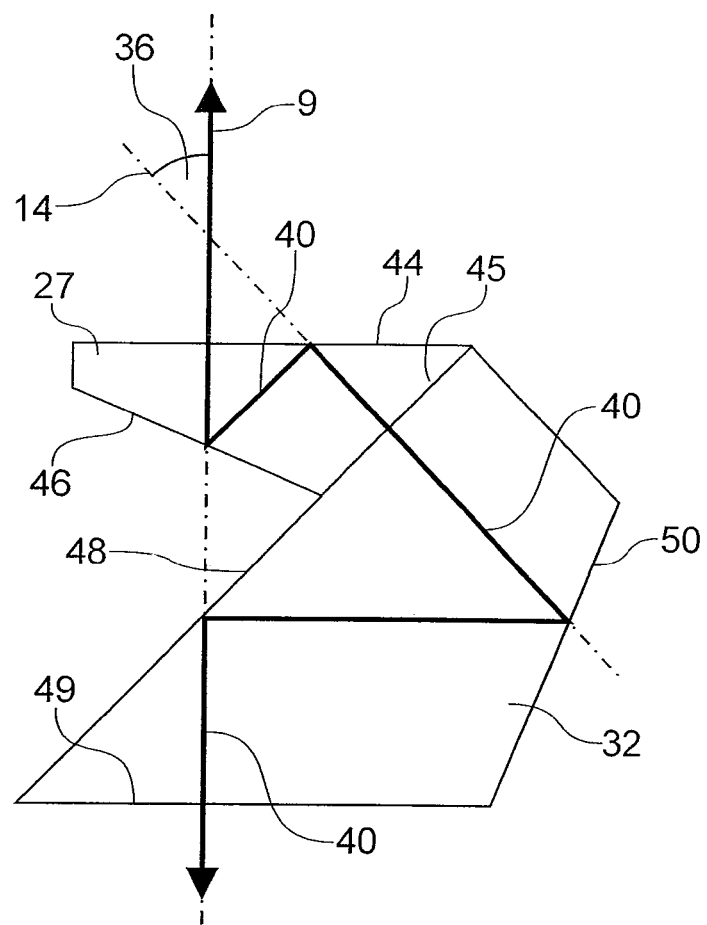
FIG. 2 is a cross section through a prismatic joint for optical coupling between the pitch frame and roll frame.

FIG. 2 shows a section through the prismatic joint formed from the first prism 27 and the second prism 32, as shown in FIG. 1. As can now be seen, the first prism 27 has a base surface 44 with respect to which the first side surface 45 and the second side surface 46 are in each case inclined. The first side surface 45 is in this case inclined at an angle of 45°, and the second side surface at an angle of 22.5°.

The second prism 32 comprises a base surface 48 with respect to which a first side surface 49 is inclined at an angle of 45°, and a second side surface 50 at an angle of 22.5°.

In order to form the prismatic joint, the first prism 27 is arranged with its first side surface 45 and the second prism 32 is arranged with its base surface 48 plane-parallel to one another. In this case, the first prism 27 can rotate about the pitch axis 14 with respect to the second prism 32. The roll axis 9 about which the second prism 32 is mounted such that it can rotate is likewise also shown.

In order to illustrate the optical coupling, the beam path 40 along the roll axis 9 is shown once again, in the illustrated rotation position of the first prism 27 with respect to the second prism 32. A beam which enters on the object side along the roll axis 9 first of all enters the first prism on its base surface 44, and is totally internally reflected on the opposite second side surface 46. The totally internally reflected beam is once again directed towards the base surface 44, where it is once again totally internally reflected at an angle of 45°. The beam which has been totally internally reflected on the base surface 44 now emerges at an angle of 90° with respect to the first side surface 45° without any reflection loss, and enters the second prism 32 via the base surface 48, where it is totally internally reflected on the second side surface 50, is thrown back towards the base surface 48, and is once again totally internally reflected there at an angle of 45°. The beam which is totally internally reflected on the base surface 48 of the second prism 32 is now directed in the direction of the roll axis 9 and leaves the second prism 32 without any reflection losses through the first side surface 49 in the direction of the detection/transmission unit 42 which can be seen in FIG. 1. The described optical path is independent of whether an incident beam is now imaged or an emerging beam is projected.

Figure 3:
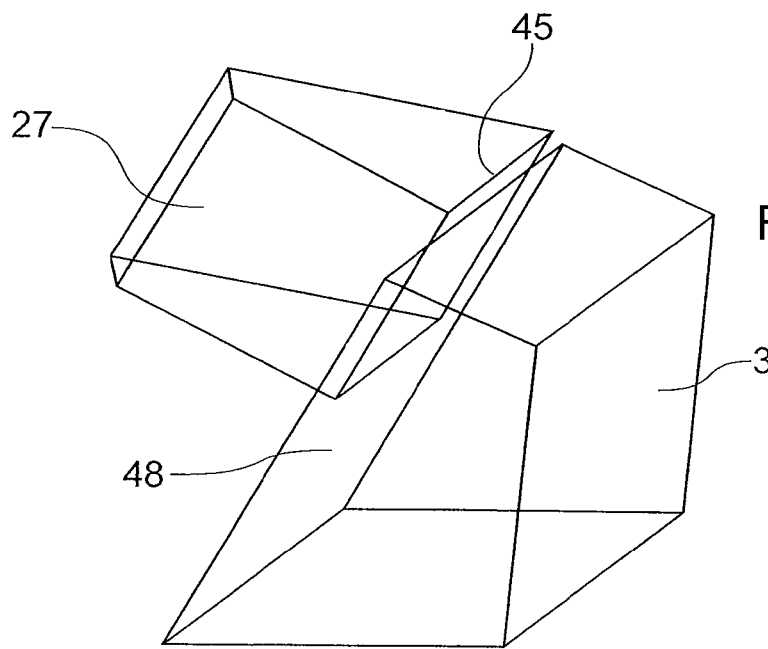
FIG. 3 is a three-dimensional illustration showing the prismatic joint of FIG. 2.

FIG. 3 shows the prismatic joint as shown in FIG. 2, which is formed from the first prism 27 and the second prism 32, in the form of a perspective, i.e., three-dimensional illustration. This clearly shows the mutually facing surfaces of the two prisms 27 and 32, specifically the first side surface 45 of the first prism 27 and the base surface 48 of the second prism 32.

Figure 4:
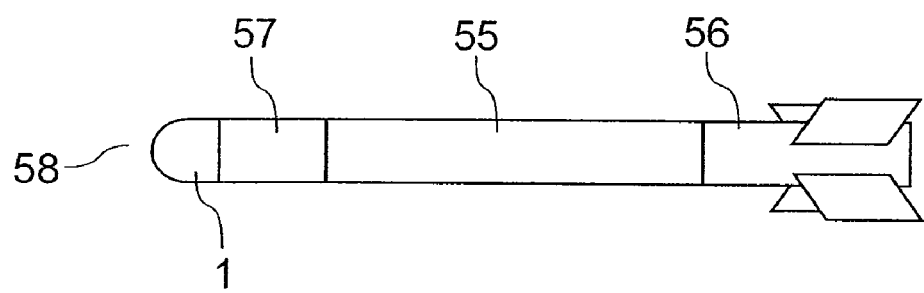
FIG. 4 is a schematic view of a guided missile.

FIG. 4 shows, schematically, a guided missile 55 which has a propulsion unit 56 and a control unit 57. There is a homing head 58 for searching for targets at the nose of the guided missile 55, in which a swiveling device 1 as shown in FIG. 1 is integrated. The swiveling device 1 is in this case used to detect targets within a large solid angle range. In this case, a spectral range in the infrared is detected and evaluated. The data detected by means of the detection/transmission unit 42 (in this case in the form of a CCD chip) is used by the control unit 57 to evaluate the field of view for target signatures, and to operate the propulsion unit 56 appropriately for target tracking.

The invention claimed is:

1. An optical swiveling device for imaging and/or projecting an object scene, comprising:
   a supporting structure;
   a detection/transmission unit disposed in the supporting structure;
   a roll frame rotatably mounted in said supporting structure about a roll axis, and a pitch frame rotatably mounted in said roll frame about a pitch axis;
   said pitch axis and said roll axis intersecting one another at an intersection angle of less than 90°;
   first deflection optics disposed in said pitch frame and configured to deflect a beam propagating along said pitch axis in an object-side direction intersecting said pitch axis at the intersection angle, and vice versa; and
   second deflection optics disposed in said roll frame and configured to deflect a beam propagating along said pitch axis in a direction along the roll axis, and vice versa.

2. The swiveling device according to claim 1, wherein said pitch axis and said roll axis enclose an angle of 45°.

3. The swiveling device according to claim 1, wherein said first deflection optics and said second deflection optics have reflection surfaces for deflection of the beams.

4. The swiveling device according to claim 3, wherein said first deflection optics and said second deflection optics each comprises a prism.

5. The swiveling device according to claim 4, wherein said prisms are disposed and arranged to each have an even number of reflection surfaces.

6. The swiveling device according to claim 5, wherein each said prism has two reflection surfaces.

7. The swiveling device according to claim 4, wherein each said prism has a first side surface, a second side surface, and a base surface, wherein said first side surface is inclined at the intersection angle to said base surface, and said second side surface is inclined at half the intersection angle to said base surface, and wherein said prisms are aligned with a first side surface and with a base surface plane-parallel to one another.

8. The swiveling device according to claim 7, wherein said first side surface is inclined at 45° to said base surface, and said second side surface is inclined at 22.5° to said base surface.

9. The swiveling device according to claim 1, wherein at least one of said first and second deflection optics is configured to produce a real intermediate image.

10. The swiveling device according to claim 1, wherein the real intermediate image is produced within said prisms.

11. The swiveling device according to claim 1, wherein said pitch frame includes a connecting element in which a structurally rigid coupling element engages for drive purposes.

12. The swiveling device according to claim 1, which comprises a transparent dome fixed to said supporting structure and hermetically sealed with respect said the supporting structure, said transparent dome enclosing said pitch frame and said roll frame.

13. The swiveling device according to claim 1, integrated in a homing head of a guided missile.

14. An optical swiveling device for imaging and/or projecting an object scene, comprising:
   a supporting structure;
   a detection/transmission unit disposed in said supporting structure;
   a roll frame rotatably mounted in said supporting structure about a roll axis;
   a pitch frame rotatably mounted in said roll frame about a pitch axis and revolvable with a complete revolution with respect to said roll frame;
   said pitch axis and said roll axis intersecting one another at an intersection angle of less than 90 °;
   first deflection optics disposed in said pitch frame and configured to deflect a beam propagating along said pitch axis in an object-side direction intersecting said pitch axis at the intersection angle, and vice versa; and
   second deflection optics disposed in said roll frame and configured to deflect a beam propagating along said pitch axis in a direction along the roll axis, and vice versa.

* * * * *